United States Patent
Frick et al.

(10) Patent No.: US 7,113,315 B2
(45) Date of Patent: Sep. 26, 2006

(54) PROFILING DEVICE, ELECTRONIC PROJECTOR EQUIPPED THEREWITH AND PROCESS FOR THE PROFILING OF AN ELECTRONIC DISPLAY DEVICE

(75) Inventors: Beat Frick, Buchs (CH); Peter Ehbets, Zurich (CH); Francis Lamy, Zollikon/ZH (CH)

(73) Assignee: Gretag-Macbeth AG, Regensdorf (CH)

( * ) Notice: Subject to any disclaimer, the term of this patent is extended or adjusted under 35 U.S.C. 154(b) by 439 days.

(21) Appl. No.: 10/760,517

(22) Filed: Jan. 20, 2004

(65) Prior Publication Data

US 2004/0150835 A1    Aug. 5, 2004

(30) Foreign Application Priority Data

Jan. 28, 2003    (EP)    ................... 03002016

(51) Int. Cl.
*B41J 1/00*    (2006.01)
*H04N 1/40*    (2006.01)

(52) U.S. Cl. .................. 358/518; 358/1.9; 358/2.1; 345/589; 382/162

(58) Field of Classification Search ........ 356/601–613, 356/402, 406; 382/162; 358/1.9, 2.1, 504, 358/518; 345/589
See application file for complete search history.

(56) References Cited

U.S. PATENT DOCUMENTS

| | | | |
|---|---|---|---|
| 6,346,933 B1* | 2/2002 | Lin | 345/157 |
| 6,788,412 B1* | 9/2004 | Pfister | 356/402 |
| 2002/0118380 A1* | 8/2002 | Kreuger et al. | 358/1.9 |
| 2003/0011563 A1 | 1/2003 | Wada | |
| 2004/0119993 A1* | 6/2004 | Edge et al. | 358/1.9 |
| 2005/0094209 A1* | 5/2005 | Hasler et al. | 358/2.1 |

FOREIGN PATENT DOCUMENTS

| | | |
|---|---|---|
| EP | 1150159 | 10/2001 |
| EP | 1205902 | 5/2002 |

OTHER PUBLICATIONS

European Search Report dated Jul. 3, 2003.

* cited by examiner

*Primary Examiner*—Hoa Q. Pham
(74) *Attorney, Agent, or Firm*—McCarter & English, LLP

(57) ABSTRACT

An electronic projector (beamer) is equipped with a profiling device (100) internally or externally connected thereto through standard interfaces. The profiling device includes all functionalities required for the color management (color measurement, calibration, profile generation, etc.) and corresponds with the projector (200) by way of a simple text based protocol. The latter can be implemented relatively easily by way of software in the projector, so that no changes to the fundamental concept of the projector are required. The profiling device can therefore on the one hand be easily integrated at the factory into existing projectors and on the other hand used as external complement to available projectors. The profiling device can however also be an independent device for the profiling of other electronic display devices (for example monitors) as well as for other, for example metrological tasks.

30 Claims, 8 Drawing Sheets

PROFILING DEVICE, ELECTRONIC PROJECTOR EQUIPPED THEREWITH AND PROCESS FOR THE PROFILING OF AN ELECTRONIC DISPLAY DEVICE

FIELD OF THE INVENTION

The invention relates to a profiling device intended especially for an electronic projector and to an electronic projector equipped with such a profiling device. The invention further relates to a process for the profiling of a display device supplied with a stream of image data.

The present invention preferably deals with the improvement of the color reproduction quality of electronic display devices (displays) in general and electronic data and video projectors (beamers) in particular.

BACKGROUND ART

An electronic projector (beamer) converts electronic image information signals or data into optical images and projects them onto a suitable projection surface, for example a projection screen. The beamer receives as input signal a video signal from the video card of a computer or any other analog or digital signal source, for example a video recorder or a DVD player. If the input signal is not already present in digital form, it is digitalized in the beamer and broken up into the color components R, G and B. An optical modulator is controlled with the color signals R, G and B after various adaptations and corrections. The modulator is read out by way of illumination optics and projected by way of projection optics onto a projection surface. Today's beamer technologies use as optical modulators either TFT-LCD's (thin film transistor-liquid crystal displays), polysilicone-LCD's or a matrix of moveable micro-mirrors, for example the DMD-chip (digital micro-mirror device) from Texas Instruments. Optical modulators are generally also referred to as light valves.

The optical system of beamers is normally optimized for maximum efficiency of the exposure and projection optics. It is thereby the goal to produce on the projection surface an image of the highest possible light intensity in order to achieve the highest possible visible contrast in rooms which are not darkened.

The color reproduction quality of simple beamers is relatively low despite careful calibration (brightness, contrast, color temperature). Compared to a monitor image, clearly visible color tone shifts occur. Furthermore, the colors appear insufficiently saturated because of the construction for maximum light intensity. Modem beamers are therefore equipped with a transformation stage (color space converter) which transforms the supplied digital or digitalized input signal into the color space of the beamer and thus significantly improves the color trueness of the reproduction, whereby the limits are then given essentially only by the color space (gamut) reproducible by the beamer and the reflective properties of the projection surface. The transformation parameters used in the color space converter describe the required corrections.

Color management and color management systems are principally known and are generally used in digital color reproduction processes. A comprehensive and clear analysis of the background, technologies and applications of color management systems is found in the publication "Postscriptum on Color Management, Philosophy and Technology of Color Management" by the authors Stefan Brües, Leanne May and Dietmar Fuchs, published by the company Logo GmbH, a company of the Gretag-Macbeth Group in August of 1999. A further discussion of color management is found, for example in chapter 17 "Device Independent Color Imaging" of the book "Color Appearance Models" of Mark D. Fairchild, first edition, published 1997 by Addison Wesley.

A color management system allows a true to color reproduction of an image original in a digital process which can include an input medium (for example a scanner or digital camera) and several output media (for example monitors and printers). The original is digitized with the input medium and the RGB values of each image pixel are stored in a data file. The RGB image can be reproduced on a monitor or by way of a beamer or recalculated for output on a printer in the print colors CMYK (cyan, magenta, yellow, black). The true to color reproduction is achieved by the application of a device calibration and device profiles. The above mentioned color space converter essentially realizes a device profile, as is known from color management, in hardware.

In the device calibration, the base adjustments of the device are selected as optimal as possible for the desired reproduction. For a beamer this includes, for example, adjustment of the contrast, the brightness, the white and black point as well as the color temperature according to the desired type of illumination. The calibration can be optimally carried out in a generally known manner by way of color measurement devices and especially made reproducible.

A device profile describes the color space of an input or output device, in that it assigns to the device specific color vales (for example RGB or CMYK) absolute color values (XYZ or CIE Lab L*a*b*) according to the specifications of the CIE (Commission Internationale de l'Eclairage) or other not device specific color values (for example sRGB). A device profile typically consists of various color value replacement tables (lookup tables) and coefficients of a color space transformation matrix. The device profile is strongly dependent on the device calibration. In order to successfully carry out color management, it is therefore a prerequisite that the calibration of all input and output devices involved does not change. It must be kept in a constant condition by regular control and readjustment.

For the true to color image reproduction, the color management system combines the profiles of the input and output medium and in that way obtains a transfer characteristic. At the same time, the CMS carries out a mapping of the color space of the input device onto the color space of the output device. This mapping ensures that all colors can be reproduced on the output medium. The mapping, which means the resealing of the color spaces, is carried out according to different reproduction criteria, the so-called rendering intents. One thereby distinguishes between the modes "perceptual" (equal color impression in the image), "relative colorimetric", "absolute colorimetric" and "saturation", which are defined in document ICC-1: 1989-09 of the International Color Consortium.

For the profile assembly, the color space of the input and output devices must be measured with specialized color measurement devices or by way of colorimetrically calibrated samples, so-called test charts. For optimal results, the color measurement technology used should be based on the spectral measurement (spectrolphotometry). This enables the recognition of metamerism and fluorescence, as well as the correct evaluation of different illumination types.

The color management and most of all the color measurement technology for the beamers is more involved compared to monitors, which as output medium are also controlled with RGB signals. The reason therefor lies in the fact that with the beamer the color impression depends not only on the device itself, but also on the reflection and diffusion characteristics of the projection surface (for example screen), the spectral distribution and the brightness of the ambient light in the room, as well as perception and experience determining factors of the human observer, for example, the degree of adaptation of the eye. These factors must be metrologically captured and taken into consideration in the color management system. These factors are also responsible for the fact that a base calibration and profiling carried out during the manufacture of the beamer does not enable optimal color reproduction. Ideally, the calibration and profiling must be carried out at the user in regular intervals and repeated, so that changes and aging processes in the optical system of the beamer can also be compensated.

A beamer with an integrated color management system is described in EP-A-1 150 159. The beamer is equipped with an integrated or externally connected color measurement device, which is constructed as a tri-stimulus color measurement device or preferably as a spectrophotometer. The color measurement device receives the light remitted (reflected and scattered) by the projection surface within a measurement region (measurement spot) and produces the corresponding absolute (standardized) color measurement values X, Y and Z (or values derived therefrom). A profile producing function and a calibration function are further provided in the beamer in addition to the normal components and functional units, which cooperate with the color measurement device and receive its color measurement values as input data. The color measurement values produced by the color measurement device are then analyzed in the beamer for the automatic first and recalibration and for the calculation of the device profile (adjustment of the color space converter). Since the color measurement device measures the light coming back from the projection surface, the profile produced on the basis of the color measurement values describes the whole transfer characteristic of the beamer starting from the analog or digital video data stream supplied to the beamer, through the beamer itself and the projection surface, up to the eye of the observer.

The beamer described in EP-A-1 150 159 requires that the beamer be originally equipped with the required components to cooperate with the color measurement device and to be able to analyze its measurement values in the mentioned manner. However, most of the commercially available beamers are not equipped in this way.

SUMMARY OF THE INVENTION

It is now an object of the present invention to provide the possibility to equip beamers after-market in a comparatively simple manner with calibration and profile producing functions according to the methods of the color management, without requiring fundamental interventions in the concept of the beamer.

This object is achieved, among others, by a profiling device, especially for an electronic projector, which includes a color measurement unit for producing digital color measurement values corresponding to measurement light impinging thereon, a processor for the control of the color measurement unit and for the processing of the color measurement values produced thereby, a bi-directional interface controlled by the processor for the exchange of data and control command with an external device connected with the profiling device, especially an electronic projector, whereby the processor, the color measurement unit and the interface are combined into an independent compact unit of construction, and whereby the processor includes a profile generation program which can be started by a start command input from the external device through the interface and on the basis of the color measurement values produced by the color measurement unit calculates a device profile which the processor provides through the interface for acceptance by the external device.

According to the main idea of the invention, the profiling device therefore includes all functionalities required for the color management and corresponds with the beamer through a standard data interface in the beamer by way of a prearranged, preferably simple, text based protocol. The latter can be implemented very simply in the beamer without substantial intervention, for example by a so-called firmware upgrade, so that no changes of the fundamental concept of the beamer are necessary. However, because of the construction of the profiling device in accordance with the invention, it can also be used as a standalone device for the profiling of other electronic display devices (for example monitors) and as a color measurement device.

BRIEF DESCRIPTION OF THE DRAWINGS

Preferred embodiments of the invention will now be further described by way of example only and with reference to the attached drawings, wherein.

DETAILED DESCRIPTION OF THE PREFERRED EMBODIMENTS

Figure 1:
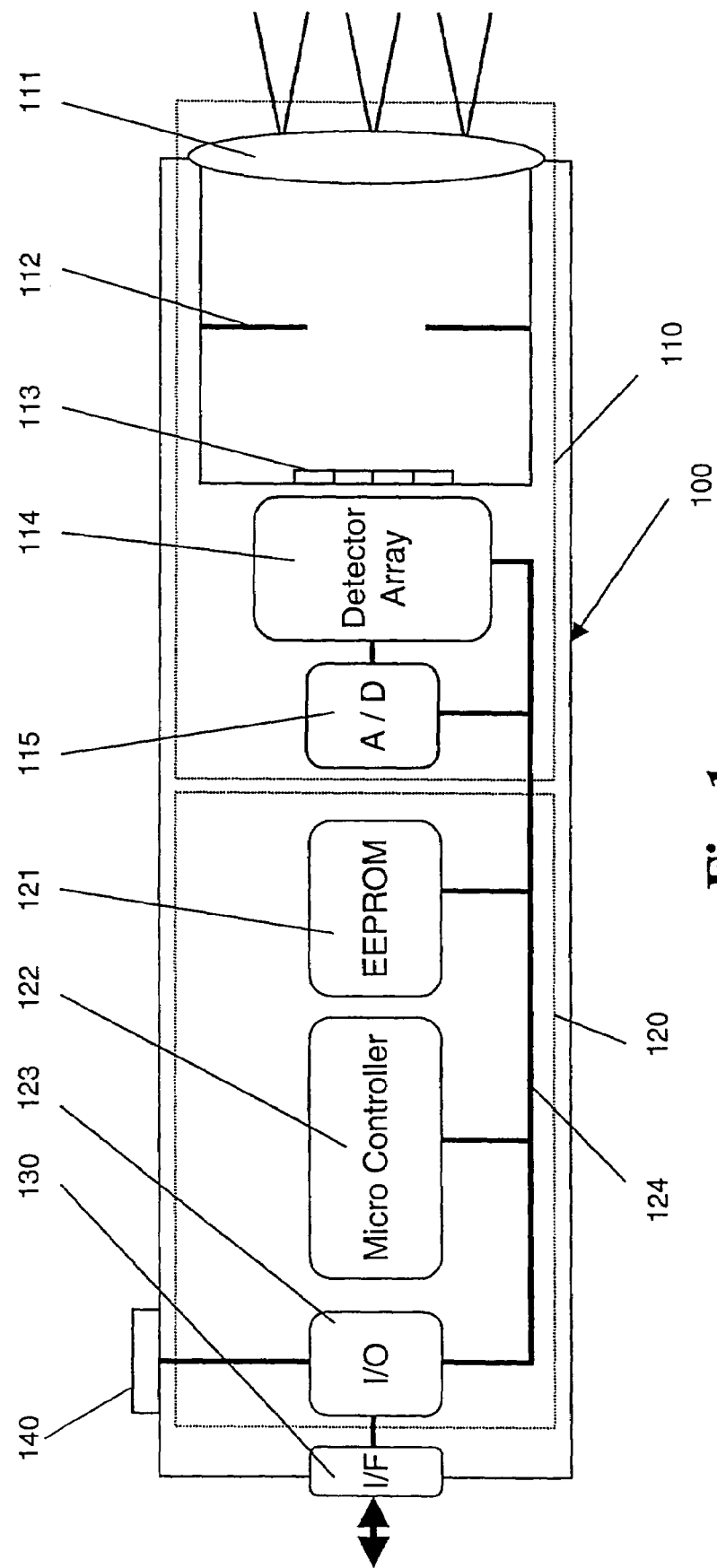
FIG. 1 is a schematic illustration of the most important components of a preferred embodiment of the profiling device in accordance with the invention.

FIG. 1 shows a profiling device 100 in accordance with a preferred embodiment of the invention, including essentially a color measurement unit 110 and a digital micro-controller based processor 120. The conventionally constructed color measurement unit includes an input optics 111, a shutter 112, a set of color filters 113, a photo detector array 114, and an A/D converter 115. The processor which is also of conventional construction includes a memory 121, a processor (microcontroller) 122, an input/output control 123 and a bus 124. A bi-directional interface 130 and an actuating element 140 in the form of a push button switch are connected to the processor through the input/output control. Of course, the processor also includes a working memory, which is however not illustrated for reasons of clarity.

The input optics 111, preferably adapted for remote measurements, directs the light coming from the object to be measured (for example a projection surface illuminated by an electronic projector) in a small area of angular space through the shutter 112 and the color filters 113 onto the photo detector array 114, which produces therefrom corresponding electrical signals which are converted by the A/D converter 115 into corresponding digital measurement values. The processor 120 controls the photo detector array 114 and the A/D converter 115 on the basis of a program stored in its memory 121, processes the digital measurement values produced by the A/D converter 115 and controls the communication with the actuating element 140 and the interface 130 as well as the associated data and command streams. The profiling device is controllable through the interface 130 by way of an external processor and can output data and commands to an external processor through the interface 130.

In the illustrated example, the measurement unit 110 is constructed as a three-range (tri-stimulus) filter—color measurement device, whereby the measurement values represent the color values X, Y and Z according to CIE (Commission Internationale de L'Eclairage). Alternatively, a calibrated RGB-measurement device can also be used. In a further alternative embodiment, a spectrometer can also be provided in place of the color filter set 113, whereby the spectral measurement data would then be recalculated according to the standards of the CIE in the processor into the color measurement values X, Y and Z (or values derived therefrom). In the following, color measurement values are understood to always represent the color value triplet X, Y, Z (or and equivalent multiple of values derived therefrom, especially absolute color values).

So far, the illustrated profiling device 100 corresponds in construction and principal function fully and wholly to a conventional processor controlled color measurement device, for example, the device sold by the company Gretag-Macbeth, Regensdorf, Switzerland, under the name "Spectrolino". The differences relative to the prior art reside in special additional functionalities which are implemented by software stored in the memory 121. This will be discussed in more detail further below.

Figure 3:
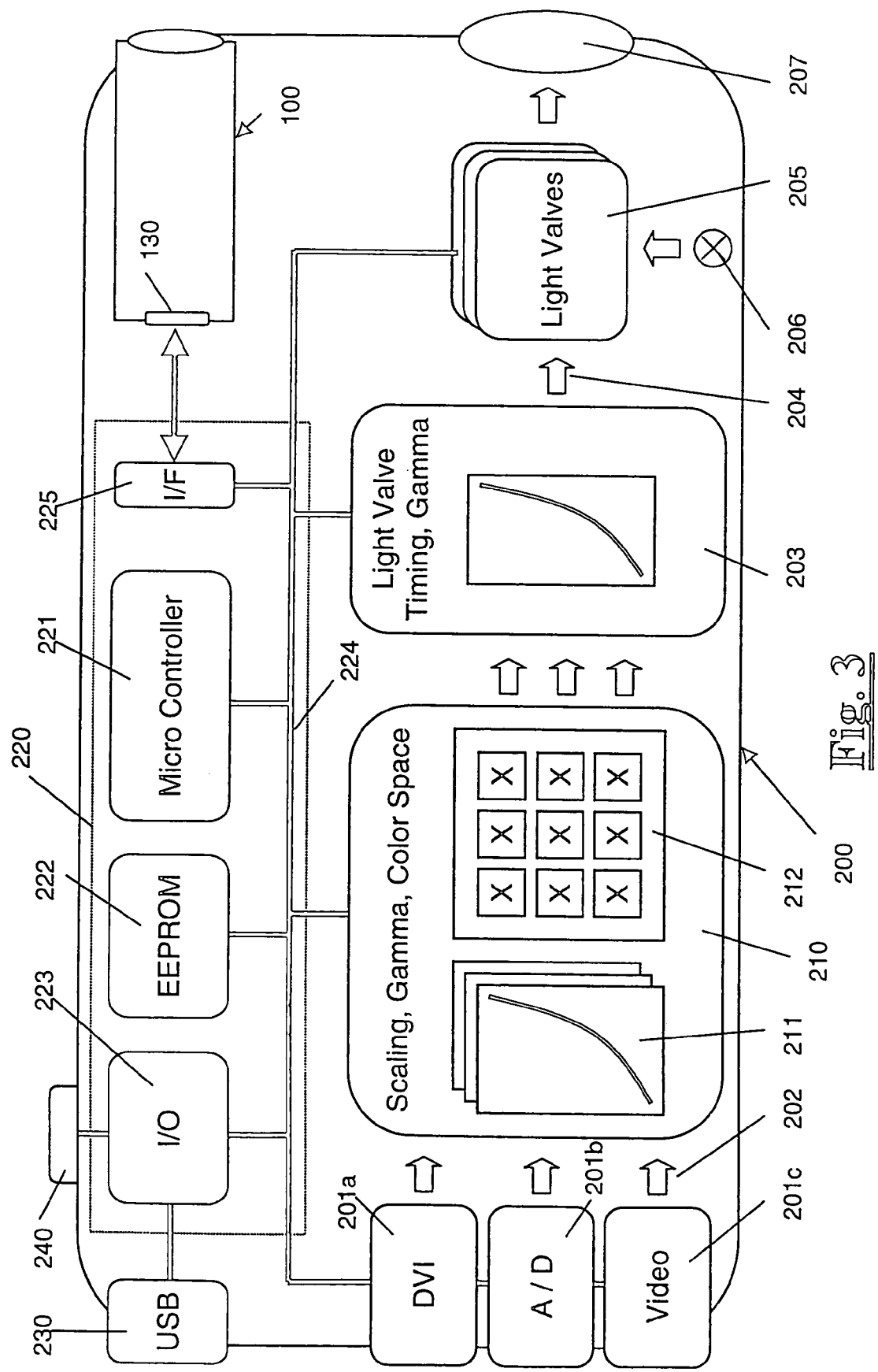
FIG. 3 is a schematic illustration of the most important components of a preferred projector in accordance with the invention.
Figure 5:
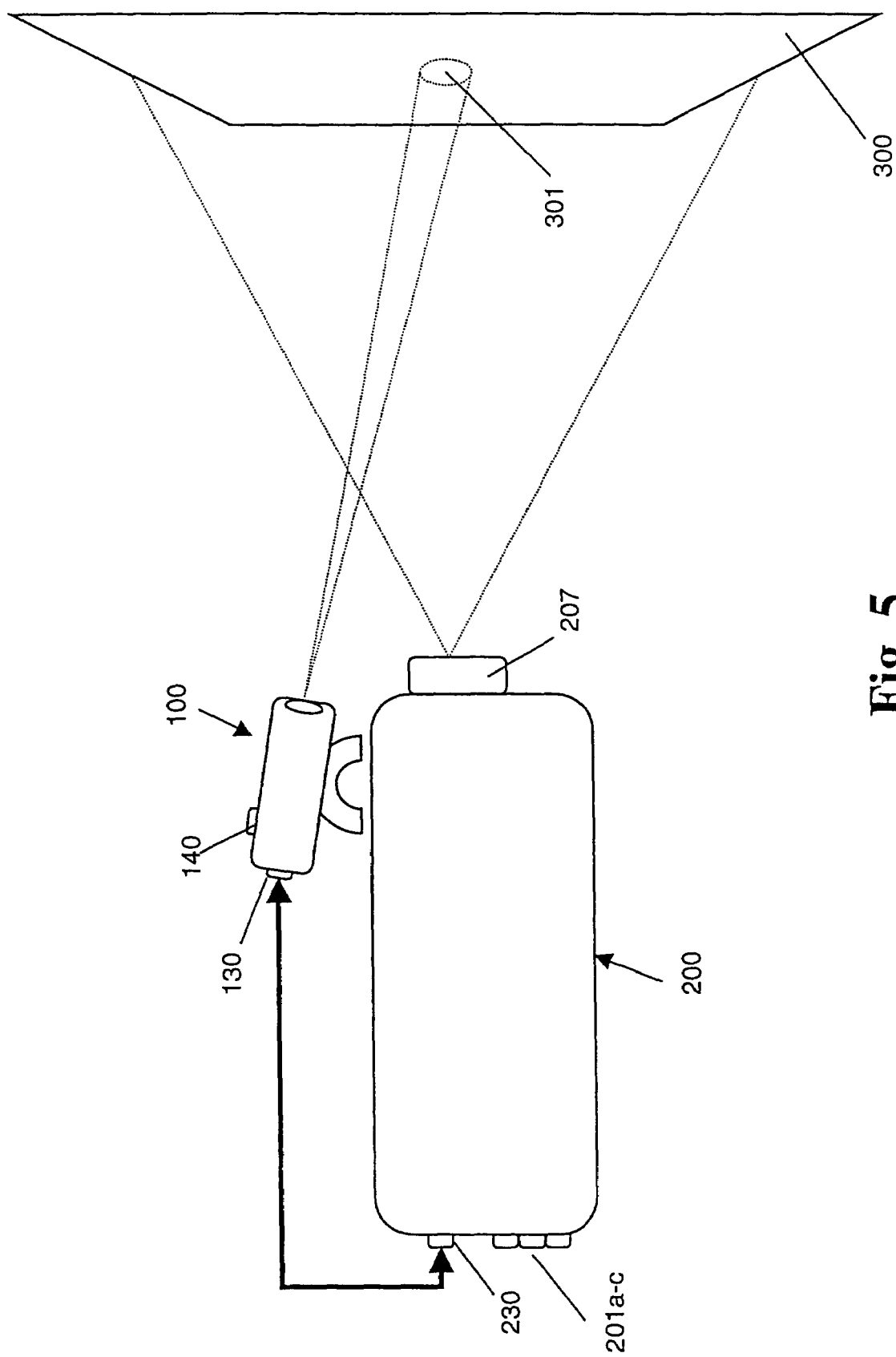
FIG. 5 shows the combination of a profiling device as shown in FIG. 1 with a projector in practical use.

The profiling device 100 in accordance with the invention is especially adapted for use in combination with an electronic projector (beamer). It can, as illustrated in FIG. 3, thereby be physically integrated into the beamer or realized also as a separate device, whereby it in practical use is then connected through its interface 130 (and a corresponding external interface of the beamer) with the beamer or with another device (FIG. 5). However, the profiling device 100 is in each case constructed as an independent, compact constructional unit. For the beamer-internal use, the interface 130 is preferably constructed as I²C or RS232 interface, for the use as external device preferably as USB interface. Of course, the profiling device can also be provided with two or more interfaces (of different type), whereby it would then be even more flexible in its use.

Figure 2:
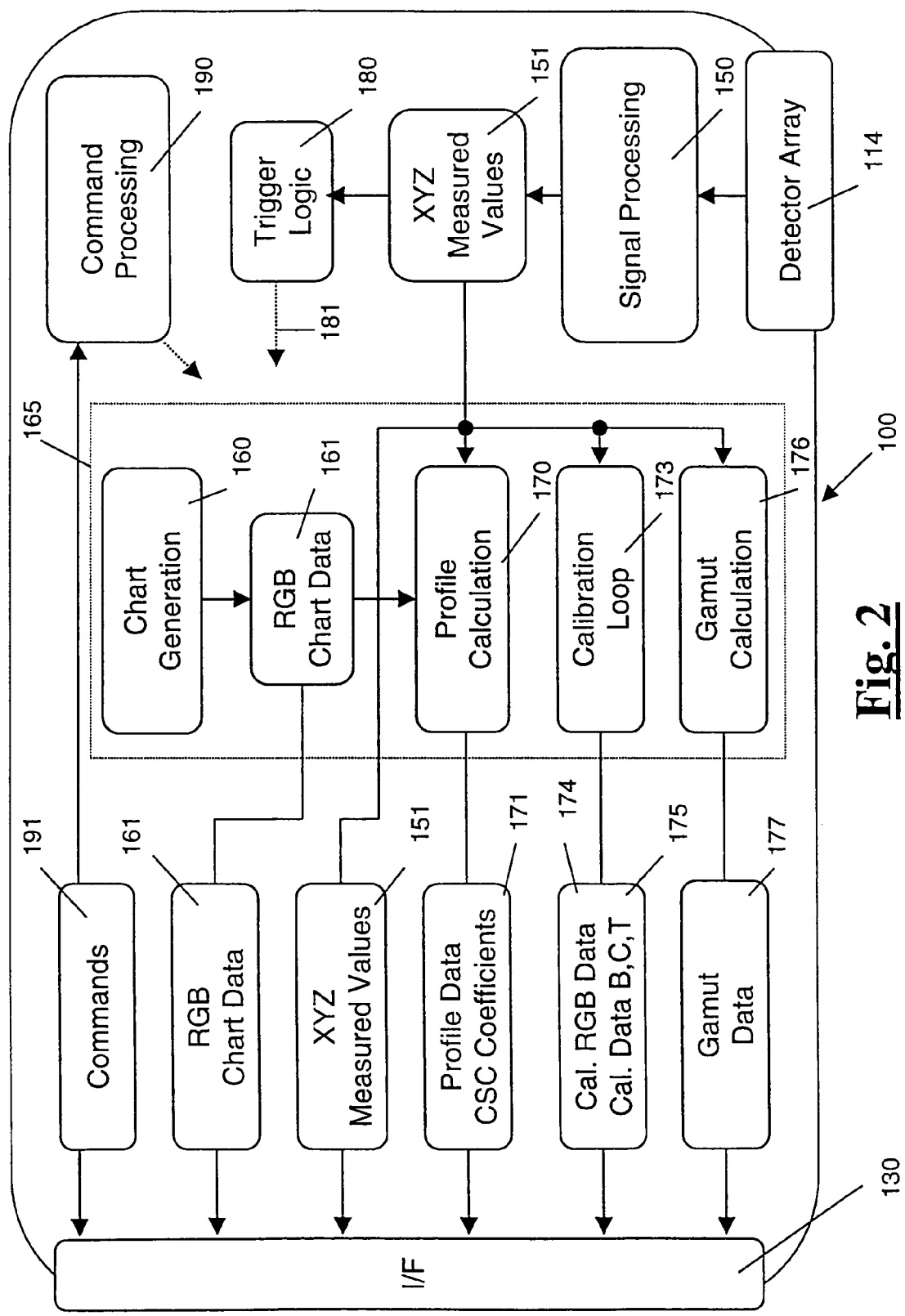
FIG. 2 is a block diagram of the software modules essential for the operation, and of the data stream of the profiling device shown in FIG. 1.

The modules of the software stored in memory 121 of the profiling device 100 and essential to the invention and the associated data and command streams are illustrated in FIG. 2.

The software includes a signal processing module 150, a chart generating module 160, a profile calculation module 170, a calibration module 173, a gamut calculation module 176, a trigger module 180 and a command processing module 190.

The signal processing module 150 controls the photo detector array 114 and the A/D converter 115 in the manner common to processor based color measurement devices and forms digital XYZ color measurement values 151 from the measurement signals produced by the photo detector array 114 and corresponding to the measurement light received.

The chart generating module 160 produces RGB color values corresponding to the individual color fields of a stored or calculated color table as generally customary and known for profiling purposes. These color values in the following referred to as setup RGB color values 161 are supplied to the profile calculation module 170 and output at the interface 130.

The profile calculation module 170 calculates in a generally known manner a standardized (for example ICC) device profile 171 which is output at the interface 130, from the setup RGB color values 161 supplied by the chart generating module 160 and the corresponding measured XYZ color measurement values 151.

The calibration module 173 produces setup RGB calibration values 174 for calibration purposes and calculates therefrom and from the corresponding XYZ color measurement values 151 in a generally known manner adjustment values or calibration data 175 for the control of the brightness B, the contrast C and the color temperature T of the beamer, which setup RGB calibration color values 174 and adjustment values or calibration data 175 are output at the interface 130.

The gamut calculation module 176 calculates in an also generally known manner gamut data 177, which describe the color space achieved, from the XYZ color measurement values 151 produced by the measurement of the color table.

The trigger module 180 analyzes the measured XYZ color measurement values 151 and produces upon recognition of one (or several) predefined color value sequences a trigger signal 181 which in a manner to be described can be used for the start of a profile calculation sequence and/or a calibration sequence.

The command processing module 190 finally analyzes command data supplied through the interface 130 according to a predetermined protocol (for example the command for the start of a profile calculation sequence) and conversely outputs command data corresponding to the program progress through the interface 130. The module 190 further controls the data stream between the other program modules and the interface 130.

Figure 4:
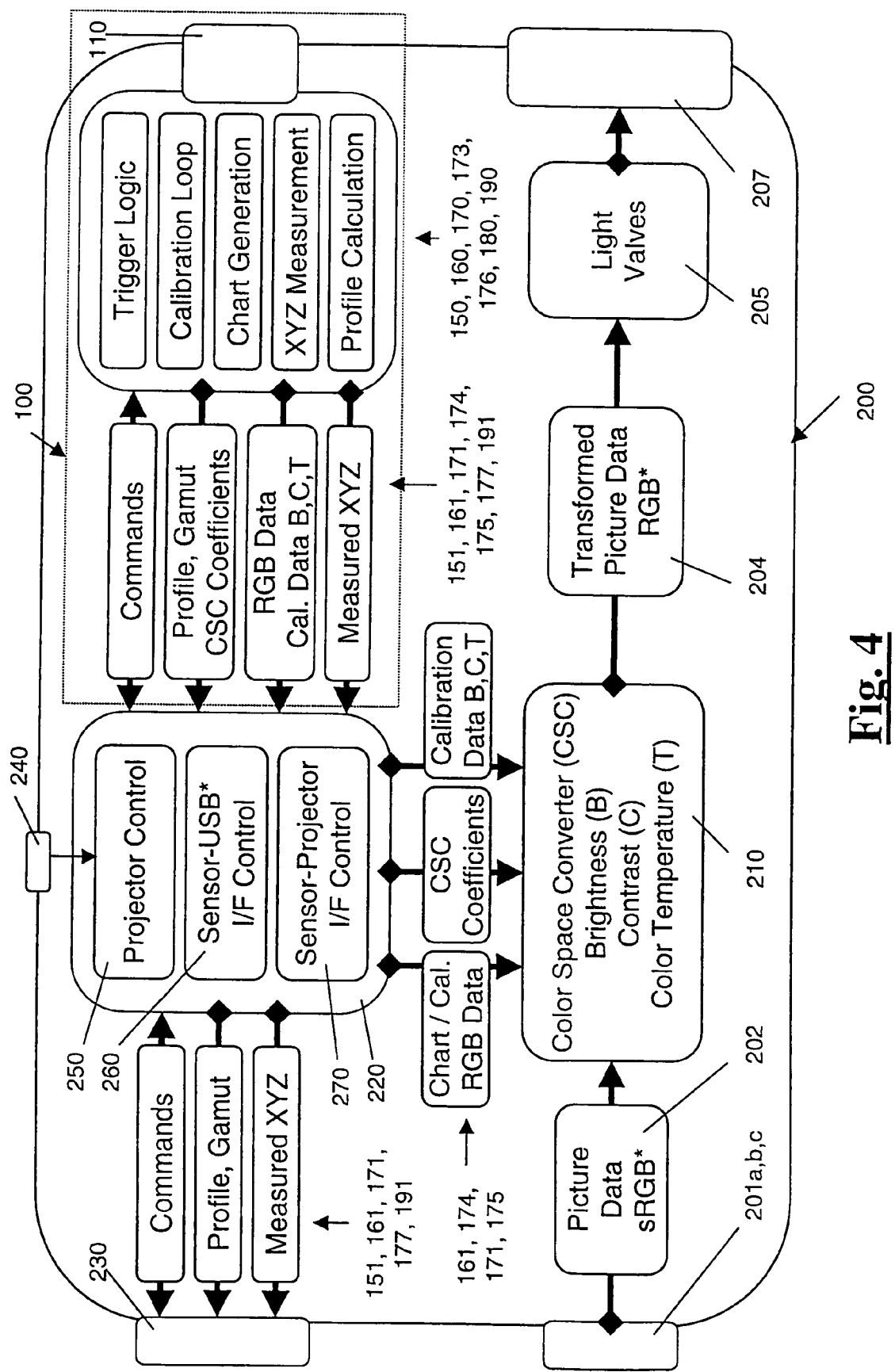
FIG. 4 is a block diagram of the software modules essential for the operation of and the data stream of the projector shown in FIG. 3.

Before the individual program modules or their functionality are further discussed, a preferred embodiment of an electronic projector in accordance with the invention is described by way of FIGS. 3 and 4, which is equipped with the above described profiling device in accordance with the invention.

FIG. 3 shows the essential functional components of an electronic projector in accordance with the invention. The projector overall referred to as 200 includes on the input side one or more input stages 201a–201c for different image signal types and standards, for example output signals of a DVI-device, digital RGB image signals or analog video signals of different standards. Depending on the image signal type, a digitalization is carried out in the input stages. Digital image data 202 are always present at the output of the input stages, ideally in sRGB format.

The digital image signals enter a transformation stage 210, which includes a scaling and gamma correction stage 211 and a color space converter. (CSC) 212 The scaling and gamma correction stage 211 is realized by color value replacement tables (lookup tables) in the memory, while the color space converter 212 essentially consists of a multiplication matrix, for example realized by the integrated circuit TMC2272A of the company Fairchild Semi-conductor. The color value replacement tables 211 are normally responsible for the adjustment of brightness B, contrast C and color temperature T, while the multiplication matrix 212 causes the rotation of the color space. The image data produced by the transformation stage 210 and transformed into the RGB color space of the projector are supplied to a modulation adaptation stage 203 also realized by color value replacement tables, where they are subjected to a further gamma correction, which takes into consideration the properties of the light modulator 205 used. The latter modulates the light originating from a projection light source 206 by way of the transformed (and adapted) image signals 204 supplied thereto. Digitally operating so called light valves are preferably used as light modulators, which depending on the modulation signal let light pass or block it. Such light valves are typically constructed as micro mirror fields. Of course, other types of modulators can also be used. The light modulated in space and color by the light modulator is then projected by a projection optics 207 onto a projection surface (not illustrated).

A micro-controller based control 220 is provided for the control of the mentioned functional units of the projector 200, which is of conventional construction and typically includes a processor (micro-controller) 221, a memory 222 and an input/output control 223 as well as a bus 224, a not-illustrated working memory and a bi-directional (for example I$^2$C) interface 225. The profiling device 100 according to FIG. 1 is connected to the latter through its bi-directional interface 130. Furthermore, an external bi-directional communication interface 230 and an actuating element 240 in the form of a push button switch are connected to the control or processor 221 through the input/output control 223. The processor 221 controls on the basis on a program stored in its memory 222 the input stages 201a–c, the transformation stage 210, the modulation adaptation stage 203, the modulator 205 and the light source 206, processes the data and commands originating from the profiling device 100 and controls the communication with the actuating element 240 and the external communication interface 230 as well as the associated data and command stream. An external processor for data and command exchange can be connected through the external communication interface 230 preferably constructed as a USB interface.

So far, the illustrated projector 200 corresponds in construction and principal function completely and fully to a conventional electronic projector (with the exception of the integrated profiling device 100 in accordance with the invention), for example the device sold by the company JVC under the type "DLA/XX21D", or the beamer with integrated profiling and calibration function described in the above mentioned EP-A-1 150 159. The differences to the state of the art are based on the one hand in the special construction of the profiling device 100 and on the other hand in the special functionalities resulting therefrom, which are implemented by the software stored in the memory 222.

The modules of the software stored in the memory 222 of the projector control 220 and the associated data and command streams are illustrated in FIG. 4.

The software of the projector 200 includes a projector control module 250, a data transfer module 260 and a connection module 270.

The projector control module 250 controls in a manner known in such devices the input stages 201a–c, the transformation stage 210, the modulation adaptation stage 203, the modulator 205 and the light source 206 and controls the communication with the actuating element 240 and the external communication interface 230 as well as the associate data and command streams.

The data transfer module 260 provides a data connection between the external communication interface 230 and the profiling device 100 connected through the (internal) interface 225, so that the profiling device 100 integrated into the projector 200 can communicate through the external communication interface 230 with an external device connected thereto, which means the exchange of measurement data, calculated data, chart data, control commands, and so on.

The connection module 270 finally controls the data exchange between the profiling device 100 and the projector control 220 or its projector control module 250.

The program modules of the profiling device 100 were already described with reference to FIG. 2. The data exchanged between the individual functional units or program modules in the projector 200 and in the profiling device 100 are referred to in FIG. 4 with the same reference numerals as are used in FIGS. 2 and 3 and are self-evident.

The function of the individual program modules of the profiling device 100 and the projector 200 are further described by way of example in the following. The functions are manually triggered by operation of the control element 240 at the projector 200 or, when the profiling device 100 is externally positioned, the control element 140 on the profiling device 100. If an external device (for example a PC) is connected through the external communication interface 230 of the projector 200 or the interface 130 of the profiling device 100, the start command can also originate from that external device. Finally, the functional processes can also be triggered by the trigger module 180 in the profiling device 100: This will be further described below.

The calibration of the projector concerns the adjustment of contrast, brightness and color temperature of the projector. This occurs principally by adjustment or change of corresponding control parameters in the projector.

After triggering of the calibration function, the profiling device takes over the control of all subsequent procedures. The calibration module 173 produces a series of calibration color samples and sends the associated RGB color values as presetcalibration color values 174 to the projector 200. The latter feeds these preset calibration color values as image data into the transformation stage 210 and produces on the projection surface (not illustrated in FIGS. 1–4) sequentially an imagewise representation of the individual calibration color samples. The profiling device 100 colorimetrically measures the projected calibration color samples and produces corresponding color measurement values 151. These color measurement values are analyzed in the calibration module and processed into calibration data (adjustment quantities) 175, which are sent to the projector 200 for the adjustment of contrast, brightness and color temperature.

For the adjustment of the contrast, the calibration module 173 alternately produces two white images (for example max. white 255, 255, 255 and fast max. white 250, 250, 250). The brightness difference (at initially a maximum contrast setting of the projector) is determined from the corresponding measured color measurement values. Subsequently, a contrast adjustment value C is sent to the projector which leads to a reduction in its contrast—the contrast is lowered. Subsequently, the two white images are again produced and measured, the brightness variation determined and the contrast reduced. This process is continued until the brightness difference reaches or exceeds a predetermined threshold value, which means that the projector just no longer saturates.

One proceeds analogously for the adjustment of the brightness of the projector. The calibration module 173 alternatingly produces two black images (for example max. black 0, 0, 0 and fast max. black 5, 5, 5). The brightness difference of the images produced by the projector is calculated and a brightness adjustment value B is sent to the projector which leads to an increase of its (initially minimally adjusted) brightness—the brightness is increased. Subsequently, the two black images are again produced and measured, the brightness variation determined and the brightness adjusted. This process is continued until the measured brightness difference reaches or exceeds a predetermined threshold value, which means that the level control of the projector is just above the dark threshold.

The color temperature is adjusted as individual contrast setting of the individual color channels of the projector. The color temperature can be, for example D65 ("daylight", 6500 K) or A55 ("artificial light", 5500 K). Each color temperature corresponds to a specific ratio of X:Y:Z.

The calibration module 173 produces a white image (initial RGB values 255, 255, 255), and the color temperature of the projected white image is calculated from the corresponding color measurement values 151. The contrast of the individual color channels of the projector are then reduced analogous to the above description, until the color temperature is correct. In order to achieve maximum brightness, the color contrast is of course maximum.

The calibration (base adjustment) of the projector 200 is followed by the profiling by way of the chart generation module 160 and the profiling module 170 of the profiling device 100.

The chart generation module 160 produces the RGB color values from color samples of a color sample table and sends those RGB color values sequentially as setup color values 161 to the profiling module 170 and the projector 200. The latter feeds these setup color values 161 as image data into the transformation stage 210 and produces on the projection surface (not illustrated in FIGS. 1–4) an imagewise reproduction of the individual profiling color samples. The profiling device 100 colorimetrically measures the projected color samples and produces corresponding color measurement values 151. These color measurement values are analyzed in the profiling module 170 together with the setup color values 161 and processed into a device profile 171 which is sent to the projector 200 for adjustment of the transformation stage 210, especially its color space converter 212. Prior to the profiling process, the transformation stage 210 of the projector 200 is set to "neutral" by a corresponding command of the profiling device 100. This can mean identity (image data pass unchanged), standard setting of the lookup tables 211, or adjustment according to the preceding calibration. The setup color values 161 of the color samples of the color sample table can be stored in the chart generation module 160 or also dynamically calculated. When the device profile 171 is completed, it is sent to the projector 200. The projector control module 250 extracts therefrom the data for the color value replacement tables and the matrix coefficients for the color space converter 212 and writes them into the memory locations provided therefor, so that it can use the transformation stage 210.

It can be useful for certain applications to obtain information (numerical description) on the color space (gamut), for example, measured during the profiling or achieved by the projector. This function is included in the gamut calculation module 176. It analyzes the color measurement values 151 measured, for example, during the profiling and generates therefrom in a generally known manner the gamut data 177 describing the covered color space. Such gamut data can be, for example, the maximum XYZ values. The gamut data 177 can be queried from an external device through the external communication interface 230 or, when the profiling device operates as separate device, through its interface 130.

The calibration of beamers or other devices, for example monitors, the generation of device profiles and the generation of gamut data are generally known. Calibration functions, chart generation, profile generation and gamut data generation are included, for example, in the software packet "Profile Maker" of the company Logo GmbH a company of the Gretag Macbeth Group and can be used in the profiling device in accordance with the invention without substantial change, which is indicated in FIG. 2 by the box 165 in broken lines.

Of course, a compatible protocol is required for the data exchange between the profiling device 100 and the projector 200 (or another den ice connected through the interface 130). A simple text based protocol is preferably used therefor. Commands can thereby be represented by easily understood code words, possibly followed by required parameters. Data are also preceeded by a code word followed by the numeric values corresponding to the type of the data (for example RGB values or the standardized sequence of profile data). The command processing module 190 interprets the incoming data on the basis of this protocol and formats the data to be output to the interface 130 according to this protocol. It is understood that a corresponding program module must of course also be present in the projector 200 or another device connected to the profiling device, which can understand the agreed upon protocol and correspondingly process the exchange of data.

The profiling device in accordance with the invention includes all functionalities required for the color management (color measurement, profiling, calibration, etc.) and corresponds with the projector or another connected device through one of the standard data interfaces included therein by way of an agreed upon, preferably simple, text based protocol. The latter can be implemented in the projector relatively simple and purely software based (for example by a firmware upgrade), so that no changes to the fundamental concept of the projector are required. The profiling device in accordance with the invention can thereby be easily integrated at the factory into existing projectors and also on the other hand used as external supplement to existing projectors. However, because of the construction in accordance with the invention, the profiling device can also be used as an independent device for the profiling of other electronic display devices (for example monitors) as well as for other tasks, for example metrological tasks.

The color impression in an electronic projector (beamer) is dependent not only on the device itself but also on the reflection and scatter characteristic of the projection surface (for example a projection screen), the spectral distribution and the brightness of the ambient light in the room, as well as perception and sensation determining factors of the human observer, for example the degree of adaptation of the eye. These factors are also responsible for the fact that a base calibration and profiling carried out during the manufacture of the projector does not enable an optimal color reproduction. Ideally, the calibration profiling must be carried out at the user in regular intervals and repeated, so that on the one hand all these influencing factors are considered and, on the other hand, changes and aging processes in the optical system of the projector can be compensated. The profiling device in accordance with the invention, or the projector equipped with such a profiling device makes this very easy for the user in that the latter only needs to trigger the calibration profiling process (for example by pushing of the activating element provided therefor) and everything else then runs fully automatically.

When the projector is already calibrated and profiled, a complete new profiling is not necessarily required for the adaptation to changing ambient light conditions. Instead the already existing profile can be modified on the basis of few individual measurements, especially a bright and dark measurement. The absolute XYZ color measurement values of the dark measurement can be added to the absolute color values of the existing projected profile. A chromatic adaptation or shift of the white point of the absolute color values of the beamer profile is carried out with the absolute XYZ color measurement values of the bright measurement. The chromatic adaptation of the color values can be carried out according to the formulas by Kries, as described, for example, in chapter 9 of the book "Color Appearance Models" by M. Fairchild.

This after-profiling can be manually triggered by way of the control element 240 or automatically. Since it requires only two measurements (dark, light), it can be carried out during the ongoing operation of the projector (for example during a presentation). The observer would, through the inserted projection of the white and black images required for the two measurements, perceive only a brief flickering on the projection surface, if an), which interferes very little. The automatic triggering of the after-profiling can be carried out, for example by an ambient light sensor or preferably also by the profiling device itself, in that it remains active during the whole projection time and monitors brightness and color on the projection surface in order to recognize dynamic changes. Upon a manual after-profiling/calibration, the projection light should be actively adjusted to a minimum by the projector.

When the profiling device is integrated into a projector, it can be used, as described in EP-A-1 150 159 to automatically test the calibration condition of the projector in regular intervals and to cause a new calibration and profiling or, for example, also a bulb change. The measurement data can also be analyzed for control of the general functional condition of the projector. Depending on the result of this analysis, a new calibration, possibly including a new profiling, can be automatically triggered or a request message for required maintenance work can be output.

FIG. 5 illustrates how the profiling device 100 in accordance with the invention can be connected as an independent device with an electronic projector 200 through its external communication interface 230. In order for the profiling device and the projector to cooperate, analog software functions must of course be present in the projector in accordance with the invention of FIG. 3. The profiling device 100 is here provided with a swivel or pivot stand and in the practical use positioned and oriented, for example on the projector 200, so that it receives measurement light from a relatively small measurement spot 301 essentially at about the center of the region of the projection surface illuminated by the projector.

Figure 6:
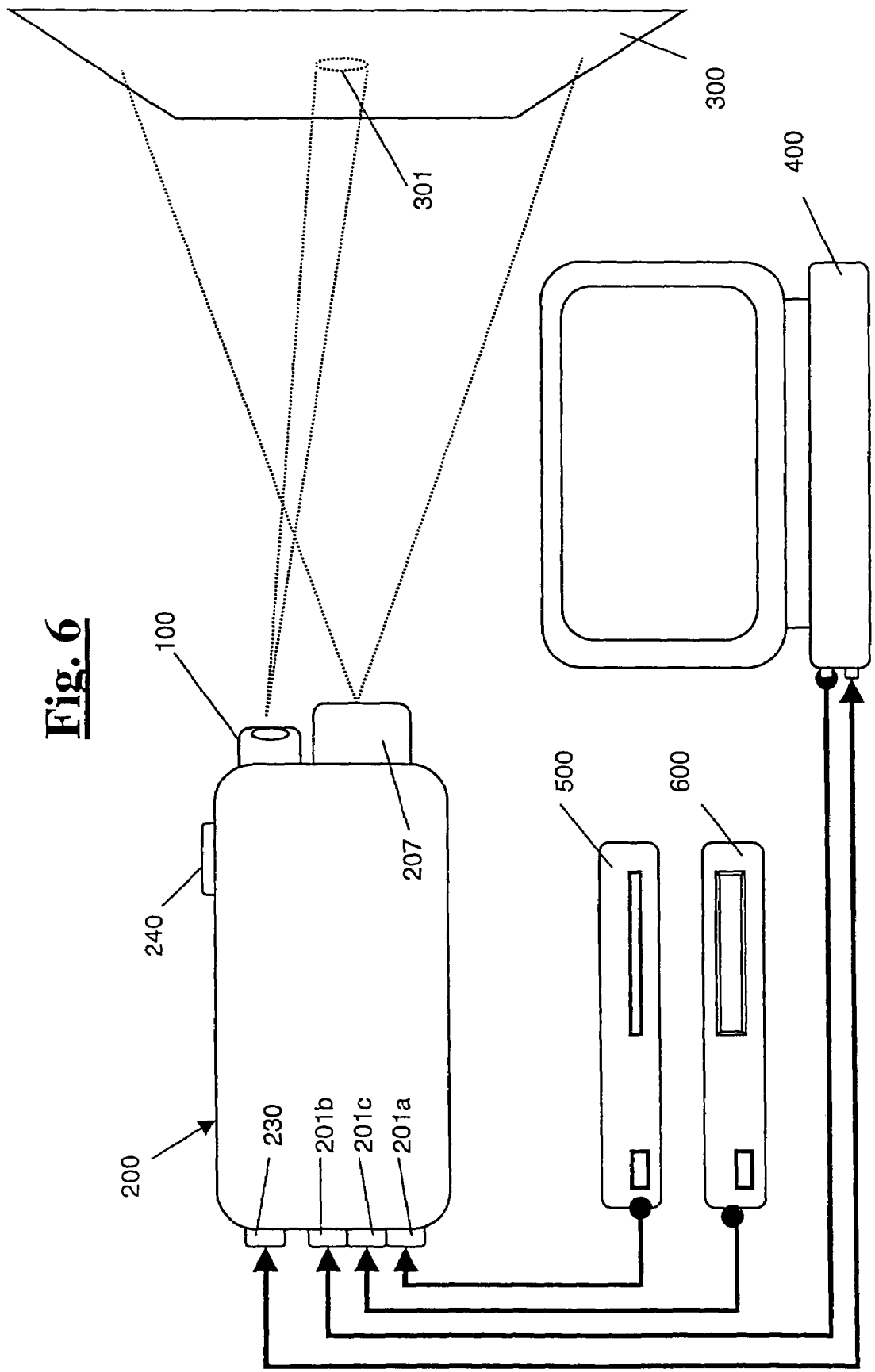
FIG. 6 shows a combination of the projector shown in FIG. 3 with various image signal sources and an external computer.

FIG. 6 illustrates how the projector 200 in accordance with the invention can be connected in practical use with other image data sources. The projector thereby receives image data alternatively from an external processor 400, from a DVI layer 500 or from a video (tape) player 600. The external processor 400 is furthermore connected through one of its communication interfaces with the communication interface 230 of the projector 200 and can thereby communicate by way of suitable software with the projector 200 and the profiling device 100 integrated therein.

Figure 7:
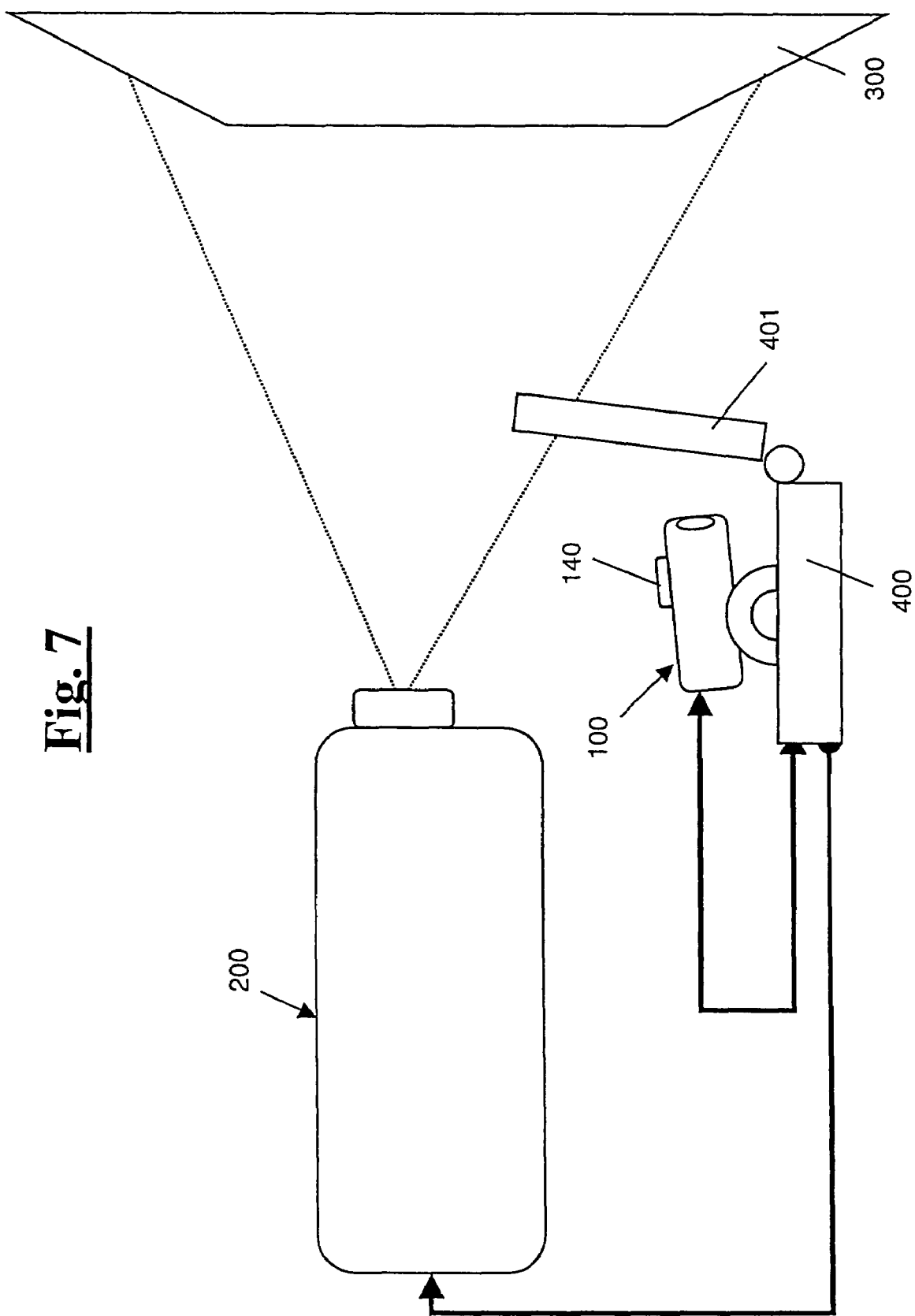
FIG. 7 illustrates the use of the profiling device in accordance with the invention for the profiling of the monitor of a computer.

As already mentioned, the profiling device in accordance with the invention can also be used for other purposes, such as the profiling of the monitor of a computer, as illustrated in FIG. 7. The profiling device 100 is therefor positioned in front of the monitor 401 of a computer 400 and connected with the computer through its USB interface. A software runs on the computer 400 which enables the communication with the profiling device 100. Triggered by operation of the control element 140 of the profiling device 100 or through a command of the computer 400 itself, a profiling cycle as was described above in connection with the projection device 200 is carried out The profiling device thereby sends the RGB-setup color values of the individual color samples of a color table to the computer 400 and the latter images the color samples on its monitor 401. The profiling device 100 measures the color samples reproduced on the monitor and calculates the monitor profile. The latter is transmitted by the profiling device 100 to the computer 400 and is there used in the conventional manner. When the computer 400 is used as image data source for a projector 200, it is relatively simple and comfortable for a user to synchronize in this way the color courses of the monitor 401 and the projector 200.

The profiling device in accordance with the invention can be used in an analogous manner also for the synchronization (equal contrast, equal brightness, equal color temperature) of two or more projectors (or generally display devices) operating in the same room. The qualitatively better projectors must thereby of course be adapted to the qualitatively worst projector. The calibration data of the worst projector then form the setup values for the calibration of the better projector.

In some applications, several projectors are arranged in a field, whereby each projector images a portion of the total image information (so called tiling). A synchronization of the projectors involved is thereby especially essential. Of course all partial image fields involved must for this be measured. According to a further object of the invention, this can be carried out with a modified construction of the profiling device, wherein its color measurement unit is also equipped with a locally resolving color detector field and a corresponding adapted input optics, which permit the capture of several image regions. A color detector array suitable therefore is, for example, the honeycomb color sensor of the company Mazet GmbH, Germany.

The profiling device 100 in accordance with the invention, as already mentioned, can also make the color measurement values 151 available at its interface 130. It is thereby possible to use the profiling device as a pure color measurement device for the most different applications. This is also applicable even when the profiling device 100 is integrated into a projector as illustrated in FIG. 3, whereby then, however, the color measurement values are made available through the external communication interface 230 of the projector 200. The profiling of a projector can thus also be carried out in the conventional manner by way of a profiling software running on a computer connected to the projector. The profiling software running on the computer thereby delivers the setup nominal values of the color samples of a color table and sends them to the projector for reproduction. The integrated or externally connected profiling device measures the reproduced color samples and sends the corresponding color measurement values to the computer. The profiling software in the computer calculates the device profile and sends it to the projector for adjustment thereof. Further details of this profiling method (using a classical color measurement device) are described in detail, for example, in the already mentioned EP-A-1 150 159.

With the profiling device in accordance with the invention, it is further also possible to generate an output profile for the output of picture data from any computer to a projector (or generally a display device). This is carried out principally the same as described in the previous paragraph, only that the output profile is stored in the computer. In this way, for example, several computers can be adapted to several projectors, whereby a separate output profile is generated and used for each computer-projector combination.

When the projector is fed from a picture data source other than a computer, for example an DVI-player or a video player, it can occur that the data channel from the data carrier (DVD, video tape, CD) through the respective player and connecting cable, distributor, standard converter, etc. up to the projector is not perfect. In contrast to computers, such picture data sources or players normally do not include any color management functions, so that a correction through output profiles is excluded.

According to a further important object of the invention, an "overall" calibration/profiling, which means from the data carrier through the projector up to the projection surface, is achieved in that calibration and profiling color samples (charts) are recorded onto the data carrier itself, which are then measured by the profiling device during the reproduction by way of the projector 200 and used for the calibration and profiling of the projector. These calibration and profiling color samples, referred to in the following as "video charts" can be recorded either as a leader to the actual image information on the data carrier or also on a separate data carrier (of the same type as the data carrier including the image data). The data stream representing the video charts is referred to as profiling data stream.

The video charts can principally be of the same structure as the color tables (charts) normally used for the calibration and profiling, which means a sequence of differently colored and color neutral fields, so called patches. The individual color samples (patches) are preceded by an identification sample (a defined sequence of black or black and white samples) which upon reproduction by the projector is recognized by the trigger module 180 of the profiling device 100 as trigger sequence and then leads to the triggering of the measurement process for the following color samples. Analogously, a further identification pattern follows which after completion of the measurement process triggers the profile calculation through the trigger module. The profile so calculated is then provided to the projector as already described.

Figure 8:
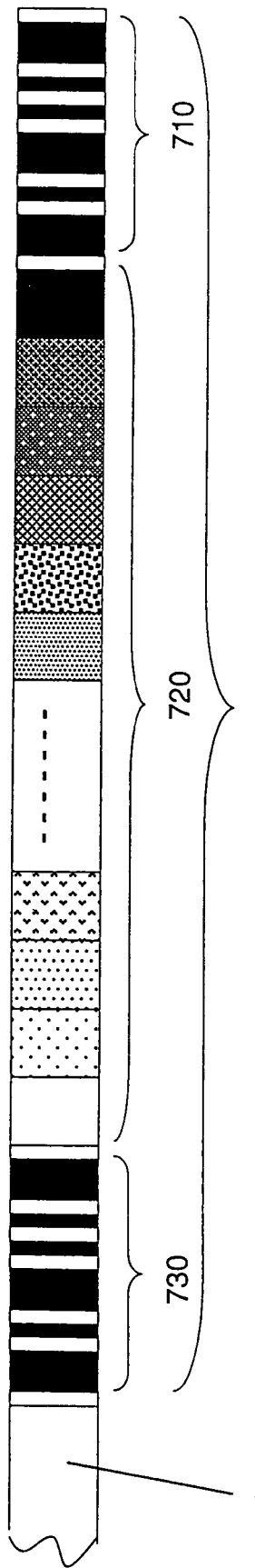
FIG. 8 is a graphic representation of a section of an image data stream.

A portion of an image data stream provided with a video chart is graphically illustrated in FIG. 8. The video chart as a whole is referred to by 700 and includes the preceding identification pattern (leader sequence) 710, the individual color samples 720 of the color table and the subsequent identification pattern (trailer sequence) 730. This is followed by the actual image data 740.

Figure 9:
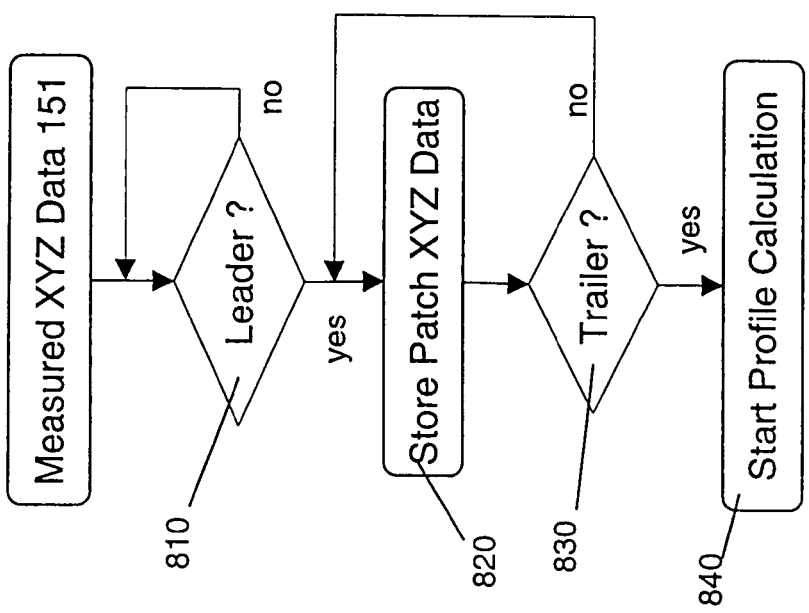
FIG. 9 is a block diagram of the most important steps of the profiling process in accordance with the invention.

FIG. 9 is a block diagram of the most important procedures of the process in accordance with the invention, which is realized by appropriate programming of the profiling device. Initially, the continuously determined XYZ color measurement values 151 in the block 810 (part of the trigger module 180) are analyzed for the occurrence of the color value sequence (leading trigger sequence) corresponding to the leading identification pattern (leader). As soon as the identification pattern is recognized, the color measurement values of the subsequent color patterns (patches) are stored (block 820) for further processing, especially the profile generation. At the same time, the color measurement values 151 are analyzed in block 830 (part of the trigger module 180) for the occurrence of the color value sequence (trailing trigger sequence) of the trailing identification pattern (trailer). As soon as the identification pattern is recognized, the calculation of the profile is triggered in block 840 (part of the trigger module 180).

If the type and sequence of the individual color patterns (patches) is not standardized (preselected), the corresponding information (the RGB color values underlying the individual color patterns) must of course also be suitably coded and recorded on the data carrier, for example in the form of a bar code analogous sequence of dark and light patches of different length. The trigger module 180 in the profiling device is then adapted to recognize this coded information and to transmit the corresponding data values to the other program modules requiring them (especially the profile generation 170).

Depending on the data carrier, a short film with user information and/or a menu guide can also be provided prior to the video chart. This applies especially for DVD, video, CD, SVCD, etc.

It is of course also possible to integrate a "video chart" as leader in an image data stream provided by a computer and to thereby achieve a calibration/profiling of the complete data channel. The "video chart" can be available, for example, as a file and in that way easily incorporated into the image data stream. This applies analogously to image data which originate from a network or the internet. It is also possible to integrate video charts into executable presentations (for example Microsoft Power Point). This list of possibilities is only exemplary and not exhaustive.

The profiling device "sees" during the calibration/profiling different marginal conditions such as ambient light (color, stability, intensity), tint of the projection surface, possibly mixed with a color tinge of the projector, ratio of useful light and foreign light, stability of the projection light (flickering). The profiling device can be equipped with software functions which query these marginal conditions and inform the user in suitable format how good a generated profile is or what can be done for improvement of the result. This informing can be carried out, for example, in three steps by way of color display elements (green, yellow, red). The profiling device can further also be equipped with software functions which enable without a new measurement a change of the so-called rendering intents (for example "colorimetric", "perceptual", "saturation") and enable a corresponding new calculation of the profile. This would allow the user to select the profiling according to his personal preferences.

The invention claimed is:
1. A profiling device comprising:
    a color measurement unit for producing digital color measurement values corresponding to measurement light impinging thereon,
    a processor for control of the color measurement unit and for processing of the digital color measurement values produced thereby, and a bi-directional interface controlled by the processor for exchange of data and control commands with an external device connected to the profiling device, wherein the processor, the color measurement unit and the bi-directional interface are combined into an independent unit, and wherein the processor incorporates a profile generation program to be started by a starting command supplied from the external device through the bi-directional interface, said profile generation program being adapted to calculate a device profile on the basis of the digital color measurement values produced by the color measurement unit and to make the digital color management values available through the bi-directional interface for acceptance by the external device.

2. A profiling device according to claim 1, wherein the external device is an electronic projector.

3. A profiling device according to claim 1, wherein the profile generation program is further adapted to produce setup color values of individual color samples of a color sample set and to make the setup color values available through the bi-directional interface to the external device, for image-wise reproduction of the corresponding color samples by the external device, and wherein the color measurement unit is constructed for measurement of image-wise reproduction of the color samples produced by the external device and for forming of corresponding color management values, and wherein the profile generation program is designed for calculation of the device profile from the provided setup color values and the corresponding color measurement values.

4. A profiling device according to claim 1, wherein the processor includes a calibration program to be triggered by a start command supplied by the external device through the bi-directional interface, and wherein the processor calculates calibration data on the basis of color measurement values produced by the color measurement unit, and wherein the calibration data is made available by the processor through the bi-directional interface for acceptance by the external device.

5. A profiling device according to claim 4, wherein the calibration program is designed for producing setup calibration color values from calibration color samples and making the setup calibration color values available to the connected external device through the bi-directional interface, and wherein the external device utilizes the setup calibration color values to reproduce an image of the corresponding calibration color samples, and wherein the color measurement unit is constructed for measurement of image reproduction of the calibration color samples produced by the external device and for formation of corresponding color measurement values, the calibration program being adapted for calculation of the calibration data from the provided setup calibration color values and the corresponding measurement values.

6. A profiling device according to claim 5, wherein the calibration program is adapted to calculate calibration data values for brightness (B), contrast (C) and color temperature (T) and to make the calibration data values available through the bi-directional interface.

7. A profiling device according to claim 1, wherein the processor includes a gamut calculation program which, upon receipt of a command through the bi-directional interface, calculates gamut data from the color measurement values and makes the gamut data available at the bi-directional interface, and wherein the gamut data describes the color space covered by the color measurement values or reproducible by the external device.

8. A profiling device according to claim 1, wherein the processor includes a trigger program for analyzing the color measurement values produced by the color measurement unit, the trigger program being adapted to react to an occurrence of one or more pre-selected color measurement trigger sequences, and wherein the trigger program is adapted to start at least one of a calibration program and the profile generation program, depending on the pre-selected color measurement trigger sequence.

9. A profiling device according to claim 1, wherein the processor is designed for providing, upon the receipt of a command through the bi-directional interface, the color measurement values at the interface which are produced by the color measurement unit.

10. A profiling device according to claim 1, wherein the processor is constructed for receiving first control data through the bi-directional interface from the external device and for providing second control data for control of the external device through the bi-directional interface.

11. A profiling device according to claim 1, further comprising an actuating element cooperating with the processor for manual initiation of at least one of the profile generation program and a calibration program.

12. A profiling device according to claim 1, wherein the color measurement unit is equipped with a locally resolving color detector array and input optics for capture of a plurality of spatially separated image regions.

13. A profiling device according to claim 1, further comprising a software function for recognition of a marginal condition based on the color measurement values and for generation of a message to a user concerning the marginal condition.

14. A profiling device according to claim 13, wherein the marginal condition is selected from the group consisting of ambient light, tint of a projection surface, ratio of inherent light to foreign light, stability of projection light, and combinations thereof.

15. A profiling device according to claim 1, further comprising a software function for enabling a change of rendering intents and recalculation of the device profile without re-measurement of the color measurement values.

16. An electronic projector comprising:
at least one input stage for electronic image data,
a transformation stage for transforming the electronic image data received through the input stage into the color space of the projector,
an optical modulator for converting the transformed image data produced by the color space converter into optical image information,
optics for projection of the optical image information produced by the modulator onto a projection surface,
a processor-based control for the transformation stage and the modulator,
a bi-directional interface and a profiling device that form an independent unit in communication with the processor-based control of the electronic projector through the bi-directional interface,
wherein the profiling device includes a color measurement unit for producing digital color measurement values corresponding to measurement light impinging thereon, a processor for the control of the color measurement unit and for processing of the color measurement values produced thereby, and a bi-directional interface controlled by the processor for exchange of data and control commands with the processor-based control of the electronic projector, and wherein the processor of the profiling device incorporates a profile generation program to be started by a start command provided by the processor-based control of the electronic projector and the processor calculates a device profile on the basis of the color measurement values produced by the color measurement unit, the device profile being provided by the processor to the profiling device for adjustment of the transformation stage and control of the adjustment of the transformation stage on the basis of the device profile.

17. An electronic projector according to claim 16, wherein the profile generation program is designed for producing setup color values of individual color samples of a color sample set and for transferring the setup color values to the processor-based control of the electronic projector, whereby the processor-based control causes the electronic projector to image wise reproduce corresponding color samples, and wherein the color measurement unit is constructed for measuring the image wise reproductions of the color samples produced by the electronic projector for forming corresponding color measurement values, and wherein the profile generation program is designed for calculating the device profile from the provided setup color values and the corresponding color measurement values.

18. An electronic projector according to claim 16, wherein the processor of the profiling device includes a calibration program to be started by a starting command produced by the processor-based control of the electronic projector for calculating calibration data on the basis of the color measurement values produced by the color measurement unit, the calibration data being provided by the processor to the control and the control calibrating the electronic projector on the basis of the calibration data.

19. An electronic projector according to claim 18, wherein the calibration program is designed for producing setup calibration color values from calibration color samples and for transferring the setup calibration color values to the processor-based control of the electronic projector, whereby the processor-based control causes the electronic projector to reproduce corresponding calibration color samples as an image and wherein the color measurement unit is constructed to measure the image wise representation of the calibration color samples by the electronic projector to form corresponding color measurement values, and wherein the calibration program is designed to calculate the calibration data from the setup calibration color values and the color measurement values.

20. An electronic projector according to claim 19, wherein the calibration program calculates calibration data values for brightness (B), contrast (C), and color temperature (T) and makes the calibration data values available to the processor-based control of the electronic projector.

21. An electronic projector according to claim 16, wherein the processor includes a gamut calculation program which on demand through the interface calculates gamut data from the measured color measurement values and makes the gamut data available at the interface, which gamut data describe the color space which is covered by the measured color measurement values or is reproducible by the projector.

22. An electronic projector according to claim 16, wherein the processor of the profiling device includes a trigger program which analyses the color measurement values produced by the color measurement unit and reacts to the occurrence of one or more pre-selected color measurement value trigger sequences and then starts at least one of a calibration program and the profile generation program dependent on the recognized color measurement value trigger sequence.

23. An electronic projector according to claim 16, wherein the processor of the profiling device is constructed to make available at the interface, upon demand through the interface, color measurement values produced by the color measurement unit.

24. An electronic projector according to claim 16, further comprising an actuating element cooperating with the control for manually triggering the starting command for at least one of the profiling and the calibration program.

25. An electronic projector according to claim 16, further comprising an external communication interface cooperating with the processor-based control of the electronic projector, the control connecting the profiling device with the communication interface such that a processor-based external device connected to the communication interface can communicate with the profiling device for data and command exchange.

26. A process for profiling of an electronic display device supplied with an image data stream for image wise representation of image information represented by the image data stream, comprising the steps of:

feeding a profiling data stream to the display device which represents an identification pattern and subsequently feeding a series of color samples of a color table that image wise represent the identification pattern and the series of color samples with the display device, colorimetrically measuring the samples image wise reproduced by the display device and determining color measurement values corresponding to each sample, detecting the occurrence of the identification pattern by analysis of the measured color measurement values and analyzing such color measurement values for process control in such a way that, after the occurrence of the identification pattern, a device profile of the display device is calculated from the color measurement values of the subsequently following color samples of the color table and the preset color values forming the basis of these color samples, and adjusting the display device with the device profile.

27. A process according to claim 26, wherein the image data stream is located on a data carrier and the profiling data stream is placed on a separate data carrier of the same type.

28. A process according to claim 26, wherein the image data stream is on a data carrier and the profiling data stream is a leader found on the same data carrier as the image data stream.

29. A process according to claim 26, wherein the profiling data stream is present as an electronic file and is inserted into the image data stream as a leader.

30. A process according to claim 26, wherein the electronic display device is an electronic projector.

* * * * *